CIRCUIT FOR SUPPRESSING UNDESIRABLE A.C. SIGNALS SUPERIMPOSED ON THE POWER SUPPLY VOLTAGE
Filed Dec. 5, 1966
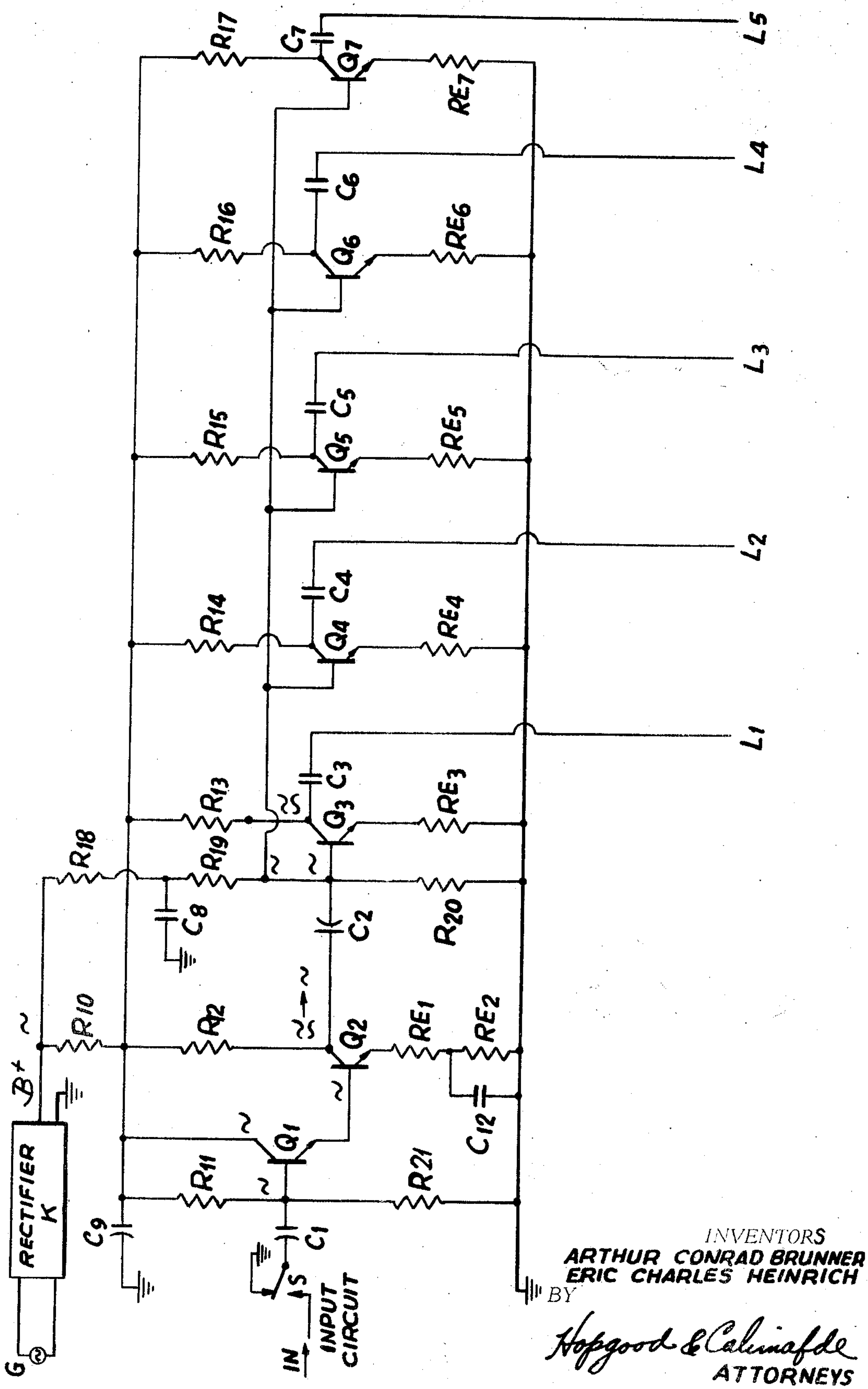
INVENTORS
ARTHUR CONRAD BRUNNER
ERIC CHARLES HEINRICH
BY
Hopgood & Calimafde
ATTORNEYS United States Patent Office 3,513,334

Patented May 19, 1970

3,513,334

CIRCUIT FOR SUPPRESSING UNDESIRABLE A.C. SIGNALS SUPERIMPOSED ON THE POWER SUPPLY VOLTAGE

Arthur C. Brunner, St. Petersburg, and Eric C. Heinrich, Seminole, Fla., assignors to Electronic Communications, Inc., St. Petersburg, Fla., a corporation of New Jersey Filed Dec. 5, 1966, Ser. No. 599,274
Int. Cl. H03k *1/02, 1/10*
U.S. Cl. 307—296 6 Claims

ABSTRACT OF THE DISCLOSURE

Undesirable A.C. signals superimposed on the power supply voltage are eliminated in a circuit including a transistor amplification stage connected in phase reversal configuration between its input and output electrodes and deriving its energization from the power supply. Means including a transistor connected in the emitter follower configuration apply a portion of the undesirable A.C. signals to the input electrode of the transistor connected in phase reversal configuration. A portion of the undesirable A.C. signals are also applied in phase to the output of said latter transistor, with the gain of the transistor adjusted to suppress the noise.

This invention relates to a circuit arrangement for decoupling a plurality of utilization circuits from each other, as well as from fluctuations in power supply voltage.

When it is desired that the output impedance be both low and constant, and the power supply voltage be available to other circuitry, power supply decoupling often becomes a problem. While low-pass R-C filtering provides some degree of decoupling, the results are not completely satisfactory. Moreover, truly effective filtering requires capacitors of large parameters and consequently of large size.

Accordingly, it is the object of this invention to provide a decoupling arrangement which is superior to that generally secured by the use of R-C filtering and which accomplishes this result with fewer components than those conventionally necessary.

It is a further object of this invention to provide a decoupling arrangement which is vastly more economical in both monies and volume than conventional decoupling arrangements.

It is a still further object of this invention to provide a circuit arrangement which may be used in conjunction with a plurality of such circuits all coupled to a common power supply and which suppresses signal carry-over between the circuits.

Briefly, the invention is predicated upon the concept of applying the same undesired signals to the base and collector of an isolation stage transistor with a voltage gain depending upon the two signal ratios.

The above mentioned and other features and objects of this invention and the manner of attaining them will become more apparent and the invention itself will best be understood by reference to the following description of an embodiment of the invention taken in conjunction with the single figure which is schematically illustrative thereof.

Referring now to the drawing, a circiut including transistors $Q_1$ through $Q_7$ may be seen coupled to a power supply including an A.C. source G, and a rectifier K. It is the purpose of thi sinvention to take any A.C. signal which may appear on the B+ line and reduce it sufficiently so that its effect upon any of the outputs $L_1$ to $L_5$ is negligible. In order to aid in explaining the invention, it may be noted that small sine wave figures are depicted at various points in the drawing. These are instantaneous representations of the undesired noise in order to depict the phase cancellation effected by the invention. It is further assumed that any number of additional circuits such as that shown in the figure are also tied to this same B+ line emanating from rectifier K. Accordingly, noise between circuits is not only possible, but is specifically contemplated by the invention.

For purposes of illustration, it has been chosen to show a five-stage isolator having output load circuits $L_1$ through $L_5$. The isolator is driven from a common two-stage cascaded amplifier including transistors $Q_1$ and $Q_2$. The following five stages are for isolation from a common input; each stage has a gain approximately equal to unity. For impedance matching purposes, transistor $Q_1$ is in an emitter follower configuration with the base being directly fed by the input circuit through switch S. Switch S is in the grounded position so that the B+ and intercircuit noise effect alone may be considered in discussing the invention.

The B+ noise and intercircuit noise appear at the base of transistor $Q_1$ via resistors $R_{10}$ and $R_{11}$. Capacitor $C_9$ provides some degree of decoupling, grounding a percentage of the noise in the conventional manner. The noise appearing at the base of transistor $Q_1$ appears in phase at the emitter (since $Q_1$ is in an emitter follower configuration), and thence at the base of transistor $Q_2$. The noise appearing at the base of transistor $Q_2$ is amplified and inverted in phase appearing at the collector of transistor $Q_2$. It is joined by 180° out-of-phase noise appearing through resistors $R_{10}$ and $R_{12}$.

The amount of amplification produced by transistor $Q_2$ depends upon the circuit component parameters which are determined in particular with respect to those values which would suppress the noise to the desired degree. The amplification may be modified to effect this result by adjustment of, in particular, the emitter resistor $RE_1$ which does not (as does resistor $RE_2$) have a parallel capacitor $C_{12}$ to negate degeneration. This lack of emitter bypass capacitor on $RE_1$ allows A.C. degeneration to take place and hence controls the degree of gain or amplification.

At the output of transistor $Q_2$, a net undesired signal remains, which is fed through capacitor $C_2$ to the base of transistor $Q_3$. A second undesired signal is also available at the base of transistor $Q_3$ via resistors $R_{18}$ and $R_{19}$. As before, capacitor $C_8$ is coupled to ground to reduce as far as possible the undesired noise from the B+. These two signals combine at the base of transistor $Q_3$ and are amplified inverted in phase. At the collector of transistor $Q_3$, the inverted amplified noise is combined with that appearing over the B+ line via resistors $R_{10}$ and $R_{13}$. (It bears mentioning that when transistor $Q_3$ is discussed, the comments apply with equal force to transistors $Q_4$ through $Q_7$ which are in parallel.)

By appropriate adjustment of the gains of transistors $Q_2$ and $Q_3$ any noise emanating at the B+ line is suppressed to the extent where it is negligible.

Thus, the five load circuits $L_1$ to $L_5$ are, according to the invention, rendered substantially free of noise voltages introduced to the equipment either directly by the power supply or by virtue of the fact that the power supply is coupled to other auxiliary equipment.

It has been found that utilizing resistance/capacitance decoupling to the extent permissible by the output swing required, an isolation of only −5 dbm was obtainable. This isolation relative to the desired signal of −23 dbm is only 1 2db down. Any greater isolation requires additional filtering. The price and the volume of the resistance/capacitance decoupling and filtering required to provide −65 dbm of isolation were each reduced by a factor of 5 to 1, when the circuit according to the invention was used. When 5% fixed resistors are used, an isolation of —75 dbm to —85 dbm is achievable. An isolation of —100 dbm may be obtained when precision value or variable resistors are used.

Thus, it may be seen that the invention allows simple B+ filtering, producing voltage gains with little or no B+ ripple appearing at the output. The B+ ripple reduction is itself effected simply and expeditiously by the manner in which the transistor electrodes are fed the noise.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. The improvement in a power-supply-coupled circuit for suppressing undesirable A.C. signals superposed on the power-supply voltage comprising: at least one transistor amplification stage connected in a phase reversal configuration between its input and its output electrodes and deriving its energization from said power supply; means including a transistor connected in emitter follower configuration for applying a portion of said undesirable A.C. signals in phase to the input electrode of said transistor; means for applying a portion of said undesirable A.C. signals in phase to the output of said transistor; and means for adjusting the gain of said transistor for suppressing said noise to the desired degree.

2. The improvement claimed in claim 1 in which said transistor stage is connected in common emitter configuration, the input to said transistor being coupled to the base and the output of said transistor being obtained from the collector thereof.

3. The improvement claimed in claim 2 comprising a further transistor amplification stage coupled to the output of said common emitter transistor stage in a common emitter configuration for providing the output of said circuit, each of said transistors being energized by said power supply.

4. The improvement claimed in claim 3 further comprising a decoupling capacitor coupled between ground and said power supply for reducing the A.C. ripple components thereon.

5. The improvement claimed in claim 2 wherein said means for adjusting the gain of said tranisistor comprises a resistor in series in the emitter circuit thereof, degenerating the output.

6. The improvement claimed in claim 3 further comprising redundant output transistor stages similar to said further stage and coupled in parallel thereto.

References Cited

UNITED STATES PATENTS

| | | | |
|---|---|---|---|
| 1,959,482 | 5/1934 | Lofgren | 328—266 |
| 2,622,150 | 12/1952 | Coulter et al. | 330—149 |
| 2,770,685 | 11/1956 | Hirsch | 328—240 X |
| 3,210,561 | 10/1965 | Ullman | 307—315 X |

DONALD D. FORRER, Primary Examiner

U.S. Cl. X.R.

307—231; 328—165; 330—149